United States Patent [19]

Nordmann

[11] Patent Number: 4,885,976
[45] Date of Patent: Dec. 12, 1989

[54] MAGAZINE CHAIN FOR AMMUNITION

[75] Inventor: Adolf Nordmann, Erkrath, Fed. Rep. of Germany

[73] Assignee: Rheinmetall GmbH, Düsseldorf, Fed. Rep. of Germany

[21] Appl. No.: 210,012

[22] Filed: Jun. 22, 1988

[30] Foreign Application Priority Data

Aug. 3, 1987 [DE] Fed. Rep. of Germany ....... 3725666

[51] Int. Cl.[4] .............................................. F42B 39/08
[52] U.S. Cl. ..................................... 89/35.01; 89/33.2
[58] Field of Search ................. 89/35.01, 33.14, 33.16, 89/33.2, 33.25, 45, 46, 36.08

[56] References Cited

U.S. PATENT DOCUMENTS

| 814,635 | 3/1906 | Young et al. | 89/35.01 |
| 2,460,384 | 2/1949 | Haas | 89/33.16 |
| 2,474,975 | 7/1949 | Goodhue | 89/33.14 |
| 2,542,200 | 2/1951 | Kraeger et al. | 89/35.01 |
| 2,578,706 | 12/1951 | Kinzelman | 89/35.01 |
| 2,988,962 | 6/1961 | Finn | 89/33.14 |
| 3,501,996 | 3/1970 | Lipp et al. | 89/46 |
| 3,670,863 | 6/1972 | Meier et al. | 89/33.16 |
| 4,619,181 | 10/1986 | Pehker et al. | 89/45 |

FOREIGN PATENT DOCUMENTS

| 556801 | 2/1954 | Canada | 89/35.01 |
| 1301742 | 4/1970 | Fed. Rep. of Germany | 89/46 |
| 639735 | 6/1928 | France | 89/46 |
| 727047 | 6/1932 | France | 89/46 |
| 271972 | 2/1951 | Switzerland | 89/35.01 |

Primary Examiner—Deborah L. Kyle
Assistant Examiner—Stephen Johnson
Attorney, Agent, or Firm—Spencer & Frank

[57] ABSTRACT

A magazine chain for receiving rounds of ammunition in a parallel series includes end-to-end arranged link plates articulated to one another and forming a first and a second endless link plates series extending parallel spaced to one another; side-by-side arranged retaining members extending from each link plate of the first series to a respective aligned link plate of the second series; two support faces forming part of each retaining member for partially circumferentially surrounding and engaging adjoining rounds of ammunition; and side-by-side arranged cradles extending from the link plates of the first series to a respective aligned link plate of the second series. Each cradle is articulated to link pins joining adjacent link plates to one another. A slot is provided in each end plate of each cradle centrally with respect thereto and generally radially to the respective link pins. Two levers are pivoted to each link plate and are jointed to one another by a guide pin received in the respective slot. As a result of this arrangement, during a non-linear travel of the magazine chain, adjoining link plates pivot with respect to one another and the associated support faces approach the associated cradle from opposite sides for clearing a path to radially remove a round of ammunition from, or place it into the cradle.

7 Claims, 2 Drawing Sheets

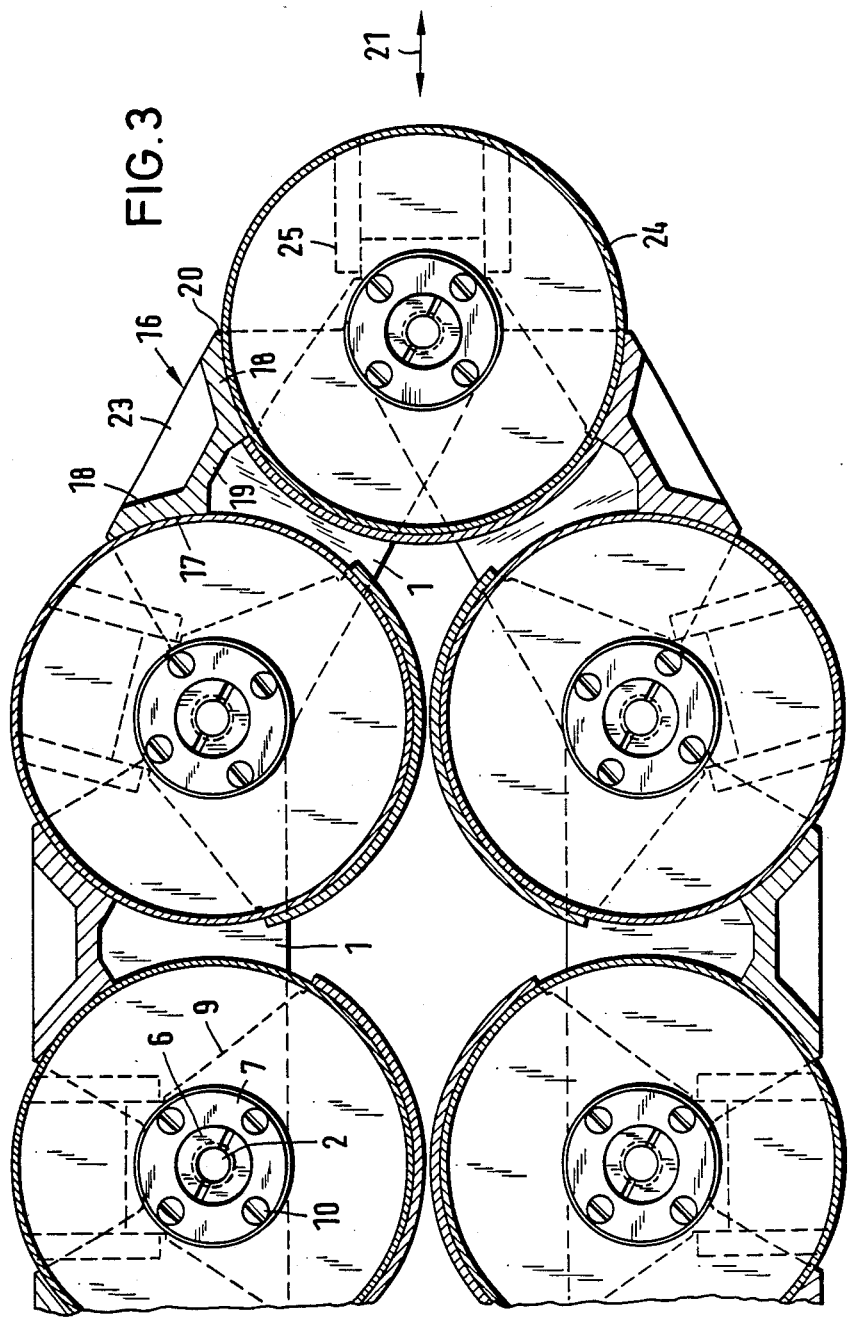

MAGAZINE CHAIN FOR AMMUNITION

BACKGROUND OF THE INVENTION

The invention relates to a magazine chain for receiving parallel positioned ammunition disposed on a continuous track. The magazine chain has retaining members, each partially surrounding two adjoining pieces of ammunition over their entire lengths. The retaining members include contact surfaces which are connected at their ends to links which are connected together by link pins to form two parallel link chains. The link pins are essentially coaxial with the longitudinal axis of the ammunition received in the magazine.

German Patent No. 1,301,742 discloses such a magazine chain for guns installed in armored turrets, particularly in armored vehicles. The trough-like retaining members which partially surround the cartridges and maintain them in their track are provided on both sides of the ammunition, and extend over the entire length of the cartridges. The retaining members are also provided with end faces at each of their ends. The adjoining end faces of adjacent retaining members form the conveyor chain and are linked in such a way that the link pins of the conveyor chain are located at the ends of the retaining members approximately aligned with the axis of the cartridges to be conveyed and are guided by means of guide rollers in two U-shaped guide rails. If such a magazine chain is employed in a turret which requires the magazine chain to be installed horizontally, the inserted ammunition is poorly supported, because the retaining members act only on the sides of the ammunition, which could lead to jamming of the gun.

SUMMARY OF THE INVENTION

It is an object of the invention to provide an improved magazine chain of the above-mentioned type in which, when horizontally installed, the inserted ammunition is supported against the force of gravity in such a way that jamming of the gun is prevented.

This object and others to become apparent as the specification progresses, are accomplished by the invention, according to which, briefly stated, the magazine chain for receiving rounds of ammunition in a parallel series includes end-to-end arranged link plates articulated to one another and forming a first and a second endless link plate series extending parallel spaced to one another; side-by-side arranged retaining members extending from each link plate of the first series to a respective aligned link plate of the second series; two support faces forming part of each retaining member for partially circumferentially surrounding and engaging adjoining rounds of ammunition; and side-by-side arranged cradles extending from the link plates of the first series to a respective aligned link plate of the second series. Each cradle is articulated to link pins joining adjacent link plates to one another. A slot is provided in each end plate of each cradle centrally with respect thereto and generally radially to the respective link pins. Two levers are pivoted to each link plate and are jointed to one another by a guide pin received in the respective slot. As a result of this arrangement, during a non-linear travel of the magazine chain, adjoining link plates pivot with respect to one another and the associated support faces approach the associated cradle from opposite sides for clearing a path to radially remove a round of ammunition from, or place it into the cradle.

The magazine chain according to the invention can be used in connection with guns installed in armored turrets, for holding shells or propellant charges, as well as cartridged ammunition. The magazine chain assures that the inserted ammunition is fully supported against the force of gravity when the magazine chain is horizontally installed.

BRIEF DESCRIPTION OF THE DRAWING

FIG. 3 is a sectional side elevational view of the preferred embodiment, shown to accommodate propellant casings.

DESCRIPTION OF THE PREFERRED EMBODIMENT

Figure 1:
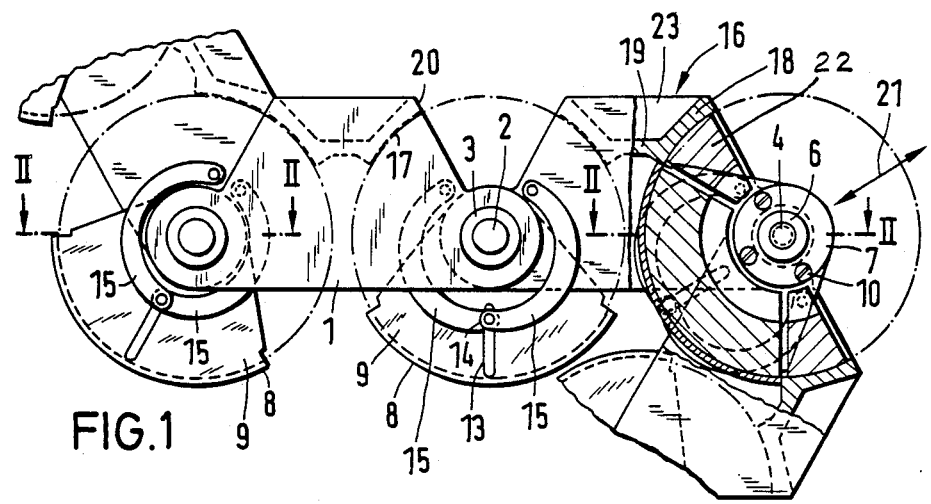
FIG. 1 shows a partially sectional side elevational view of a preferred embodiment of the invention, taken along line I—I of FIG. 2.
Figure 2:
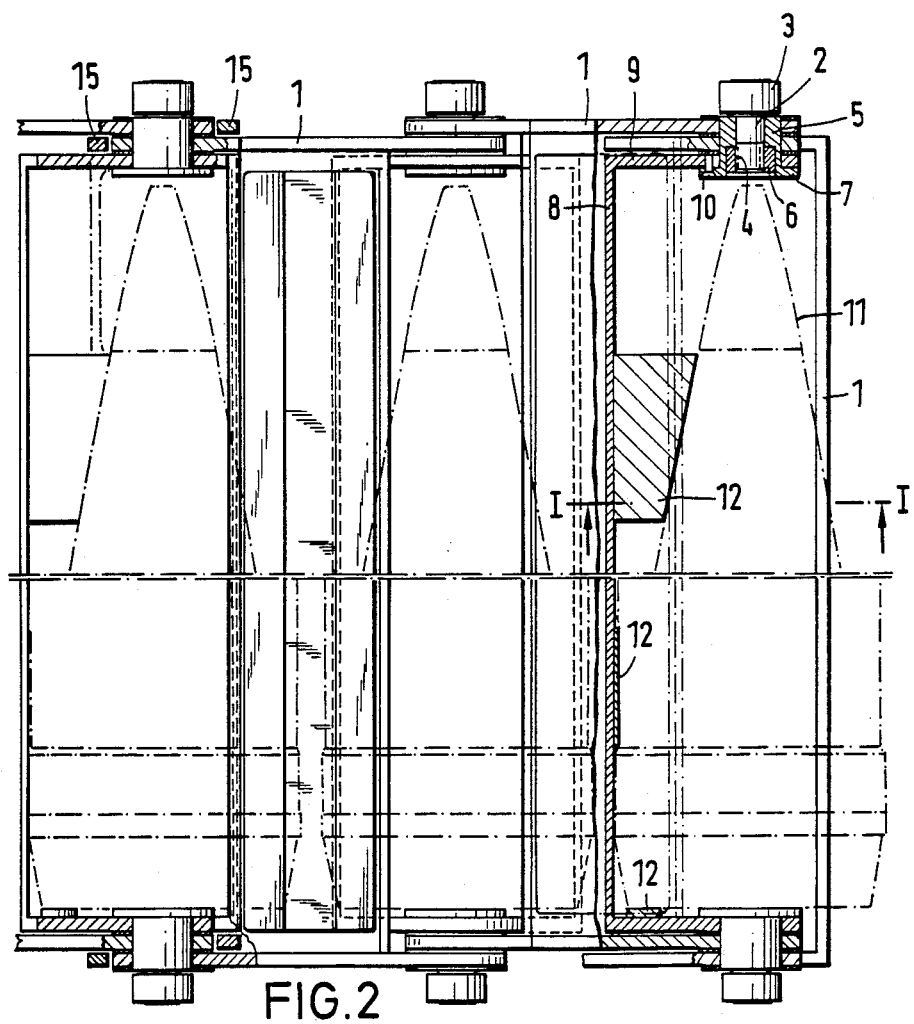
FIG. 2 is a partially sectional top plan view taken along lines II—II of FIG. 1.

The magazine chain as shown in FIG. 1 comprises link plates 1 which are connected in pairs to form two continuous, parallel link chains. Adjoining link plates 1 are articulated to one another by link pins 2, each carrying a guide roller 3 at the outside of the respective chain, for gliding along a track (not shown) on both outer sides of the link chain. The link pins 2 are provided with a threaded section 4 on their other ends which extend toward each other. Each link pin 2 also has a bushing 5 held by means of a nut 6 which is screwed on the threaded section 4 sunk in the bushing 5. Each bushing 5 has, at its end remote from the roller 3, a flange or collar 7 and extends through the two associated, adjoining link plates 1.

A cradle 8 having circular sector-shaped end faces 9 is fastened to two respectively opposite collars 7 by means of screws 10. Each cradle 8 proper also has a circular sector-shaped cross section, extending over approximately 120°. The radius of each sector in general corresponds to that of the projectiles 11 which are to be received in the cradles 8. For assuring the proper seating of the projectile 11, the cradle 8 may be provided with shaped parts 12 adapted to the shape of the projectile.

The end faces 9 of the cradles 8 each have a generally radially oriented guide slot 13 located centrally thereon and thus extending in the axial symmetry plane of the cradle 8. Each guide slot 13 extends approximately to the cradle 8. A connecting pin 14 pivotally joining the ends of two arcuate 0 levers 15 projects into and is guided by the guide slot 13. The two levers 15 are each hinged at their other ends to a respective one of the two adjacent link plates 1 jointed by the associated link pin 2 symmetrically with respect to their pivot axis passing through the guide slot 13.

When adjoining link plates 1 pivot with respect to each other at locations where the magazine chain changes direction, the cradle 8 is correspondingly pivoted from its normal position about the link pins 2 by the connecting pin 14, because the position of the latter changes, and the motion thereof is transferred to the cradle 8 via the guide slot 13.

An elongated retaining member 16 extending between adjoining cradles 8 parallel therewith, is carried by oppositely located, mutually facing link plates 1 Each retaining member has two arcuate contact surfaces 17 having a radius corresponding to that of the cradles 8. The two contact surfaces 17 are provided on webs 18 of the retaining members 16 for retaining two adjacent projectiles 11. The retaining members 16 and the cradles 8 are positioned in a staggered arrangement with respect to each other. When the magazine chain extends in a straight line, the retaining members 16 are arranged on one side and the cradles 8 are arranged on the other side of the receiving area for the projectiles 11 or propellant charges. Thus, each projectile 11 is supported by a cradle 8 and two webs 18 of two adjacent retaining members 16. When the magazine chain extends in a straight line, the cradles 8 and the webs 18 are located on symmetrically opposed sides of the projectile axis. The two webs 18 of each retaining member 16 are inclined towards each other and are connected by means of a central web 19 of the retaining member 16. The free edges of the webs 18 form stop faces 20, in the direction of the projectile axis. The stop faces 20 extend radially with respect to the adjacent pivot axis formed by the respective link pins 2. The maximum extent of outward pivotal motion of the magazine chain is determined by an abutting of two adjoining retaining members 16 and the maximum extent to which the magazine chain may turn in the inward direction is determined by an abutting of the cradle 8 with the edge areas of the central webs 19 of two adjacent retaining members 16.

The two contact surfaces 17 and the associated cradle 8 form a segment of a circle having an angle of approximately 180°. This makes the removal or loading of the projectiles 11 (as shown by double-headed arrow 21) easy in the area where the magazine chain turns inwardly. The cradle 8 encompasses approximately 120° of the segment of the circle, while each contact surface 17 extends through approximately 30°. When the magazine chain is guided horizontally (linearly), those projectiles 11 transported in the upper chain reach are supported from below over an area of 120° while those projectiles transported in the lower chain reach are also supported over 120° by way of the two contact surfaces 17 which are spaced 60° from each other and from the associated cradle 8. Thus, the inserted projectiles 11 are fully supported by the magazine chain in the upper reach as well as in the lower reach without the edges of projectiles 11 being exposed to a linear pressure stress. Loading or unloading of the projectiles 11 easily takes place at the location where the magazine chain makes the largest inward turn.

The retaining members 16 can also be provided, if desired, with shaped parts 22 adapted to the shape of the projectile or the retaining members 16 themselves can be adapted to the projectiles by corresponding shaping. The retaining members 16 are provided with transverse end faces 23. Although these faces are not essential, they aid in fastening the retaining members 16 to the link plates 1.

If the magazine chain is designed to accept propellant charges or propellant charge modules, a propellant casing 24 can be inserted instead of projectiles 11, as shown in FIG. 3. Each casing 24 is articulated to an end face 9 of the cradle 8 by a hinge 25, such that the casing 24 is pivotal inwardly or outwardly into the unloading or loading position.

The present disclosure relates to the subject matter disclosed in the Federal Republic of Germany Application No. P 37 25 666.1, filed August 3, or 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a magazine chain for receiving rounds of ammunition in a parallel series, including end-to-end arranged like plates forming a first and a second endless link plate series extending parallel spaced to one another; with each link plate of the first series there being aligned a respective link plate of the second series;

link pins articulating the link plates of said first link plate series to one another and the link plates of said second link plate series to one another;

side-by-side arranged retaining members extending from each said link plate of the first link plate series to said respective aligned link plate of the second link plate series; the retaining members being attached to the respective aligned link plates of the first and second link plate series;

two support faces forming part of each said retaining member for partially circumferentially surrounding and engaging adjoining rounds of ammunition;

the improvement comprising:

side-by-side arranged cradles extending from the link plates of the first link plate series to a respective aligned link plate of the second link plate series; each said cradle having a length defined by opposite end walls situated adjacent respective aligned link plates of the first and second link plate series; each said cradle being articulated to respective adjacent link plates by respective said link pins; each said cradle being adapted to receive a round of ammunition additionally supported by two of the support faces belonging to adjoining said retaining members;

a slot provided in each said end wall centrally with respect thereto and generally radially to respective said link pins;

two levers associated with each said link plate; each lever having a first end articulated to the respective link plate; each lever having a second end; and a guide pin received in each said slot and carried by respective said second ends of said levers; each said guide pin jointedly connecting together two adjoining levers articulated to two adjoining link plates of said end-to-end arranged link plates, whereby during a non-linear travel of said magazine chain, adjoining said link plates pivot with respect to one another and said two of the support faces belonging to adjoining said retaining members approach an associated said cradle from opposite sides thereof for clearing a path to move, in a direction transversely to said length, a round of ammunition from and into the cradle.

2. A magazine chain as defined in claim 1, further comprising shaped inserts secured to each said cradle; said inserts having surfaces conforming to outer surface configurations of the rounds of ammunition.

3. A magazine chain as defined in claim 1, wherein said levers are annular segment shaped.

4. A magazine chain as defined in claim 1, wherein each said cradle has an inner support face extending circumferentially through approximately 120°.

5. A magazine chain as defined in claim 4, wherein each said support face of said retaining members extend circumferentially through approximately 30°, whereby each round of ammunition has a total circumferential support of about 180°.

6. A magazine chain as defined in claim 5, wherein during linear travel of the magazine chain each said cradle and the two support faces associated therewith are spaced approximately 60° apart.

7. A magazine chain as defined in claim 1, further comprising a propellant container fitting into said cradles and being pivotally attached to one of said end walls thereof.

* * * * *